Oct. 30, 1934. O. E. STOKES Re. 19,357

GEARING FOR WASHING MACHINES

Original Filed Oct. 26, 1927 2 Sheets-Sheet 1

INVENTOR
Oscar E. Stokes
PER
Jeffs and Jeffs
ATTORNEYS

Oct. 30, 1934.

O. E. STOKES

Re. 19,357

GEARING FOR WASHING MACHINES

Original Filed Oct. 26, 1927 2 Sheets-Sheet 2

INVENTOR
Oscar E. Stokes
BY
Jeffet and Jeffet
ATTORNEYS

Reissued Oct. 30, 1934

Re. 19,357

UNITED STATES PATENT OFFICE 19,357

GEARING FOR WASHING MACHINES

Oscar E. Stokes, Streator, Ill., assignor of one-half to Automatic Washer Company, Newton, Iowa, a corporation of Delaware, and one-half to Altorfer Bros. Company, East Peoria, Ill., a corporation of Illinois Original No. 1,953,729, dated April 3, 1934, Serial No. 228,708, October 26, 1927. Renewed October 12, 1931. Application for reissue June 16, 1934, Serial No. 732,741

18 Claims. (Cl. 74—81)

This invention relates to gearing for washing machines.

The invention has special reference to gearing adapted to impart an oscillatory motion to an agitator for washing machines, coincidently with the actuation of means for operating a wringer.

The invention is directed to gearing mechanism, including a member driven eccentrically with respect to a driving means therefor, a rockable member and a connecting member between said eccentrically actuated means and said rockable member.

The invention includes means for optionally engaging or disengaging the gear driving means for an agitator including details of structure relating thereto. The invention includes an integrated housing means for the gear mechanism and has a container for lubricant therefor.

Referring to the drawings,—

Figure 1:
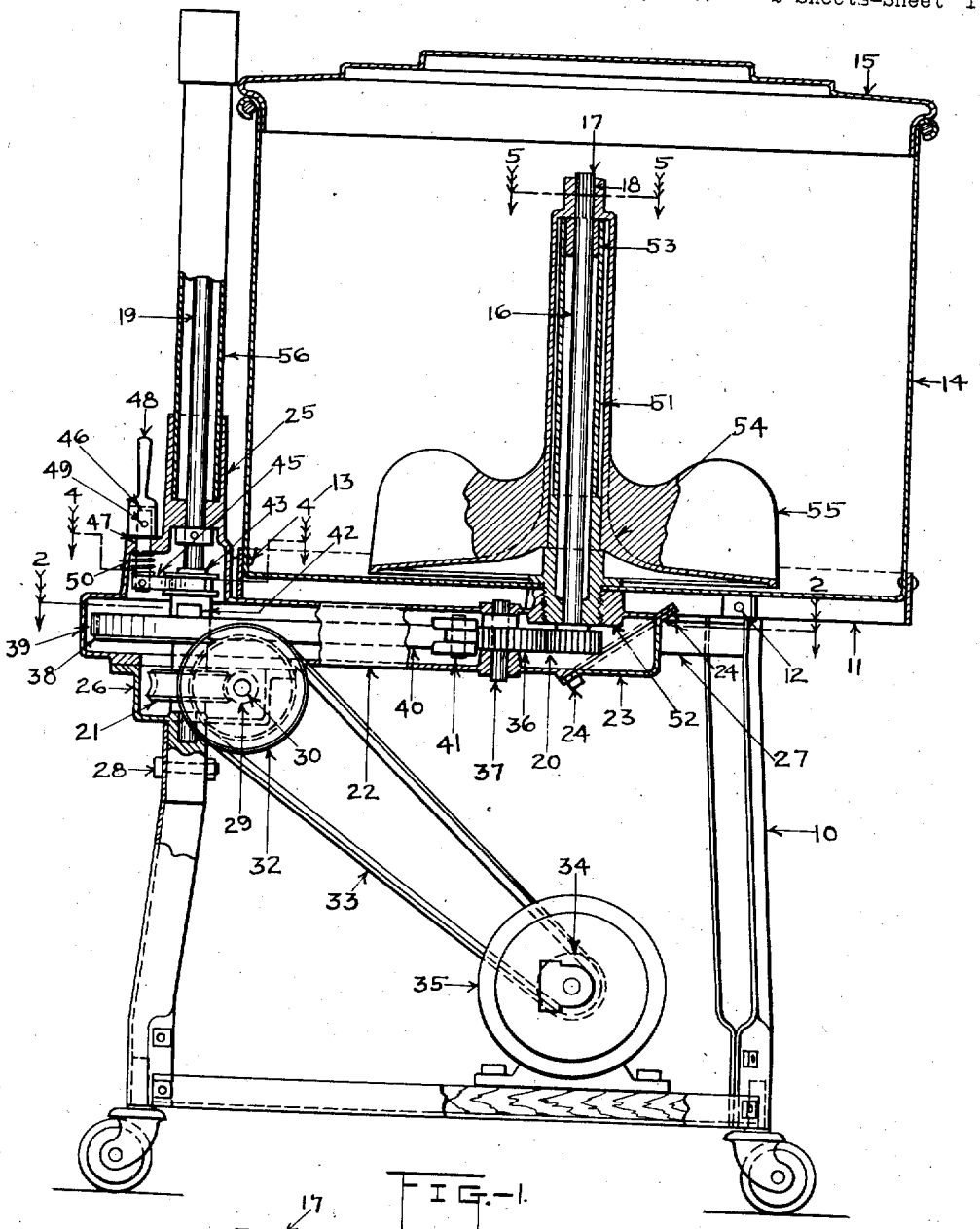
Fig. 1 is a cross-sectional view of a washing machine structure, including my gear mechanism, taken substantially on a line through the diametrical center of the tub and housing members for the wringer driving shaft.
Figure 6:
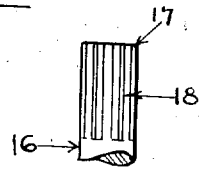
Fig. 6 is a detail view, showing the upper end of an agitator drive shaft.

In the drawings, 10 refers to leg members of a frame, there being three of such leg members; 11 is a circular bank attached, as at 12, to two of the leg members and to a gear housing member, as at 13. 14 is a tub and 15 is a detachable lid or cover for the tub.

Referring to structure within the tub, 16 is a shaft extending upwardly through the bottom thereof, the same being marginally rounded at its upper end, as at 17, and provided with a plurality of elongated vertical slots 18. 19 is a wringer shaft. 20 is a gear fixed to the lower end of shaft 16. 21 is a worm wheel fixed to the lower end portion of shaft 19.

Referring particularly to gear mechanism for operating shafts 16 and 19 and housings and supports therefor, 22 is the main transverse portion of a casing, and 23 a minor portion thereof, said casings being relatively angularly fashioned in cross section and connected together by means of bolts, as 24, to form a complete housing. 25 is an integral portion of said main housing and 26 is a detachable member thereof located beneath the main housing. The unit housing is connected at one end by means of branch bracket members 27, divergent from the minor housing member 23 and connected with relatively spaced leg members 10, the opposite end of said housing being supported in connection with one of the leg members, as at 28. 29 is a worm gear fixed to shaft 30 and adapted to co-operate with worm wheel 21. 31 is a housing sleeve for shaft 30 integrally related to detachable housing member 26. 32 is a V-band wheel fixed to shaft 30 and is adapted to be driven from belt 33 from wheel member 34 on a shaft of motor 35.

Figure 2:
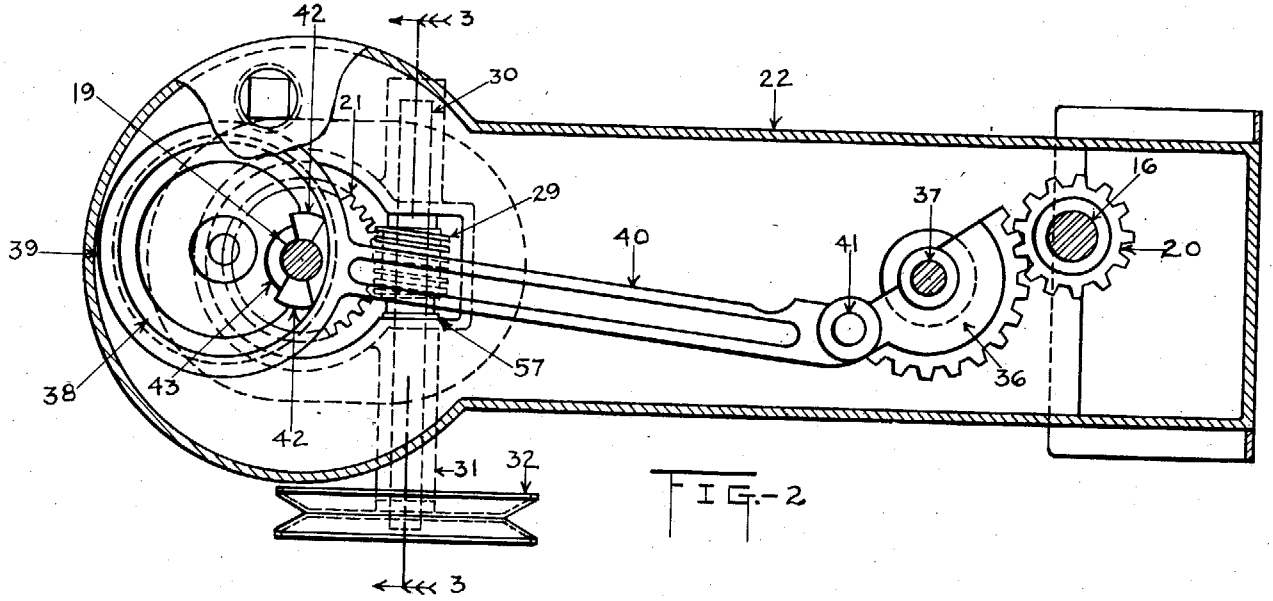
Fig. 2 is a longitudinal sectional view on the line 2—2 of Fig. 1.
Figure 5:
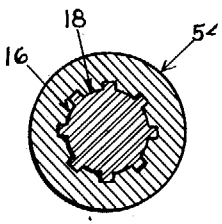
Fig. 5 is a cross-sectional view on the line 5—5 of Fig. 1.
Figure 4:
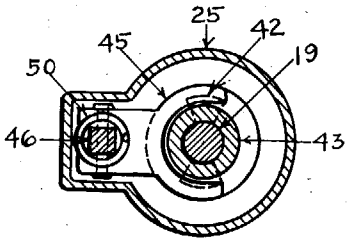
Fig. 4 is a cross-sectional view on the line 4—4 of Fig. 1.
Figure 3:
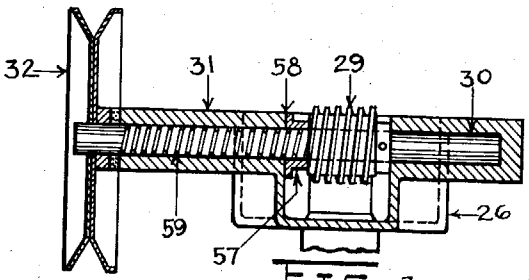
Fig. 3 is a longitudinal sectional view on the line 3—3 of Fig. 2.

Referring particularly to gear mechanism for driving gear member 20, 36 is a gear segment centered upon pivot member 37, the latter being fixed in connection with the main transverse casing portion 22. 38 is a driven eccentric disk member, the same being fixed to wringer shaft 19 at a point spaced from the center of said eccentric member and adjacent to the periphery thereof. 39 is an eccentric band centered upon eccentric disk member 38, and adapted to be driven by the latter, and 40 is a rod or pitman integrally related to eccentric bank 39 at one end and its opposing end being pivotally connected as at 41 with gear segment 36. To the upper marginal face portion of eccentric bank 39 and adjacent and radially disposed with respect to wringer shaft 19, are provided clutch lugs 42 adapted to be engaged by a clutch member on the wringer shaft 19 (see Figs. 2 and 4).

43 is a collar splined on shaft 19 for longitudinal adjustment thereof, said collar being circumferentially grooved and also being provided with lug members 44 at its lower end projecting horizontally of said shaft 19 and adapted to engage, at option, with lug members 42 on eccentric band member 39. 45 is a furcated clutch shifting member engageable with the groove in collar 43. 46 is a plunger member supported for longitudinal movement in a perforation, as 47, in vertical housing member 25. 48 is a shift member pivoted to plunger 46 as at 49, the latter being so seated in connection with a horizontally disposed face portion of the vertical housing that when said shift member is turned downwardly it would operate to lower plunger member 46 to cause collar member 43 to be depressed to effect clutch engagement of the latter with eccentric band 39, whereby driving connection will be established between wringer shaft 19 and the gear driving connection therefrom with shaft 16. 50 is a coil spring interposed between the arm portion of furcated member 45 and the beforementioned offset portion of vertical housing member 25, which said spring, when shift member is turned down, is in relaxed position, and will, when turned into vertical position, as shown in Fig. 1, operate to effect tension to maintain said shift member in vertical position and hold the clutch parts in relative relief of each other.

Referring particularly to the washing machine agitator and means for supporting and operating the same, 51 is a sleeve extending through an opening in the bottom of the tub and having threaded connection with a block member 52 forming a part of the gear housing, the said sleeve being fashioned at its lower end to form a bearing for shaft 16 and provided with a spacing member 53 at its upper end intermediate its interior surface and shaft 16 which also serves as a bearing for the upper end of shaft 16. 54 is an agitator comprising a disk-like portion at its lower extremity and extending upwardly in the form of a sleeve, the said sleeve portion being provided with an axially disposed opening having a plurality of outstanding ribs adapted to engage elongated grooved portions 18 at the upper end of shaft 16. The agitator is also provided with a plurality of relatively spaced agitator blades as 55.

56 constitutes a housing for the wringer shaft, but inasmuch as the means for housing the wringer shaft constitutes no part of the present invention, no detail description will be given either of it or of the wringer and its driving connection.

A thrust bearing is provided for shaft 30 which consists in the provision of a collar 57 interposed between worm 29 and offset or shoulder portions 58 on sleeve 31. This thrust member takes the place of the ordinary ball bearing thrust member.

Also, a salvage means is provided for any oil that may escape between the frictional bearing contacts respectively at the ends of bearing collar 57 into the supporting opening in sleeve 31 for shaft 30, such salvage means consisting in the provision of special threads 59 on said shaft, said threads being so pitched with respect to a line vertical to said shaft, that in the proper direction of turning of said shaft, such escaped oil will be fed towards worm wheel 29 for return to the general gear housing units, thus salvaging said oil against outward flow towards and to the forward opening in sleeve 31.

The housing unit herein described as including the major horizontally disposed housing portion 22, the minor housing member 23, the vertically disposed housing portion 25 and the detachable housing member 26, is designed, when assembled in unit form, to form a receptacle for oil, grease or like lubricant in quantity sufficient with respect to the capacity of the unit and the location of the gear operating members therein enclosed, to serve for complete lubrication of the bearings of said gear members to afford at least theoretically permanently continued lubrication thereof.

In operation, the parts of the device having been assembled in the relation herein shown and described wringer shaft 19 is driven permanently in a single direction and agitator shaft 16 alternately in reverse directions. In carrying out this result, a motor 35 is employed to drive belt 33, which serves to turn belt wheel 32. Shaft 30 is driven from belt wheel 32 and through worm gear 29 worm wheel 21 is driven, which serves to actuate wringer shaft 19 in a constant direction. Upon effecting a clutch relation between clutch collar 43 and eccentric disk member 38, pitman 40 is caused to be reciprocated through the connection of the eccentric band thereon with eccentric disk 38, and due to the pivotal connection of said pitman with segment gear 36, which cooperates with gear 20 on shaft 16, the latter will be caused to be reciprocated alternately reversely to cause reciprocation of the agitator. Clutching and unclutching relation is established between clutch collar 43 and eccentric disk 38 by a simple shift of collar 43 through manipulation of shift member 48 to or from a vertical position, as and according to the desire of the operator to effect driving connection to the agitator or discontinue the same.

Actuation of wringer shaft 19 will afford a means for driving the wringer through proper means (not shown) for optionally establishing or discontinuing driving connection with the latter.

Connected relation between the agitator and reciprocating drive shaft 16 therefor is established by merely sleeving the agitator upon its support. In effecting the sleeved relation of the agitator with respect to the shaft and its support, the agitator is merely placed in contact with the upper end of shaft 16 and because of the relative fashioning of the upper end of said shaft and the vertical opening in the upper end of the agitator sleeve and the arcuate fashioning of the periphery of the upper end of said shaft, movement of the shaft will readily find relative cooperating engaging slots and ribs, whereby said agitator will automatically find for itself the proper and necessary driving connection, whereupon it will seat itself with respect to said shaft to establish such proper relative driving connection.

What I claim is:

1. In gearing for washing machines, in combination, a constantly driven shaft, an oscillating shaft, driving means for the constantly driven shaft, a gear on the oscillating shaft, a disk on the constantly driven shaft in eccentric relation to the latter provided with a clutch member adjacent the axis of its support, a pitman comprising an eccentric strap embracing the disk and a reach member projecting therefrom, a pivotally supported gear member meshing with the gear on the oscillating shaft and pivotally connected with the reach member of the pitman, a shiftable clutch member actuated by the constantly driven shaft adapted to co-operate with the clutch member on the disk, and means for actuating said shiftable clutch comprising a plunger connected with the shiftable clutch, a framing support for the plunger having an offset portion adjacent its upper end, a manually operable member pivoted to the plunger fashioned for variable relative spacing with respect to the frame support of the latter when moved into varying angular positions with respect to said frame support and resilient means about said plunger and interposed between its frame support and the shiftable clutch to maintain the clutch in detachment from the disk.

2. In gearing for washing machines, a constantly driven shaft, an oscillating agitator shaft, a disk eccentrically mounted on the constantly driven shaft, a pitman comprising an eccentric strap embracing the disk and a reach member projecting therefrom, means for connecting said pitman and oscillating shaft so that rotation of said disk oscillates said shaft, and means for optionally connecting or disconnecting the disk member from operative relation with the constantly driven shaft.

3. In a gearing for washing machines, a constantly driven upright shaft, an oscillating agitator shaft, a disc eccentrically mounted on the constantly driven shaft, a pitman comprising an eccentric strap adjacent and radially disposed with respect to the constantly driven shaft and embracing the disc and a reach member projecting therefrom, means for connecting said pitman and oscillating shaft so that rotation of said disc oscillates said shaft, and means for optionally connecting or disconnecting the disc member from operative relation with the constantly driven shaft, said means comprising a clutch member on said constantly driven shaft, clutch lugs on the upper marginal face portion of said eccentric strap, said clutch lugs adapted to be engaged by said clutch member.

4. In a gearing for washing machines having a tub, said gearing being disposed below the tub, an oil-tight housing surrounding said gearing, said gearing including a wringer shaft having a portion located within said housing, worm and gear mechanism for continuously driving said shaft, a vertical agitator shaft projecting through the bottom of the tub and having its lower end within said housing, a pinion gear for driving said second shaft, a segmental gear pivoted in said housing and meshing with said pinion gear, eccentric means mounted on said first shaft and connected to said segmental gear for driving the same, and clutch means for selectively connecting and disconnecting said eccentric means to said constantly driven shaft.

5. In a gearing for washing machines having a tub, said gearing being disposed below the tub, an oil-tight housing surrounding said gearing, said gearing including a vertical wringer shaft having a portion within said housing, worm and gear mechanism for continuously driving said wringer shaft, an eccentric disc mounted on said wringer shaft, a vertical agitator shaft projecting through the bottom of the tub and having its lower end within said housing, a pinion mounted on said second shaft, a segmental gear pivoted in the housing and meshing with said pinion, an eccentric strap surrounding said disc, a pitman connecting said strap and segmental gear, and clutch means for selectively connecting or disconnecting said disc to said wringer shaft.

6. In gearing for washing machines having a tub, said gearing being disposed below the tub, an oil-tight housing surrounding the gearing, said gearing including a straight constantly driven wringer shaft having a portion located within said housing, a worm wheel on said portion of the wringer shaft, a driving shaft, a worm on said driving shaft engaging said worm wheel, a vertical oscillating agitator shaft projecting through the bottom of the tub and having a portion within the housing, means connecting the shafts to oscillate the agitator shaft, said means including a pinion connected to said agitator shaft, a pivoted segmental rack constantly meshing with said pinion, an eccentric disc on said driven shaft, a link connected to said disc and pivoted to said segmental rack, and clutch means to render said connecting means inoperative to connect the shafts whereby said wringer shaft may be driven when disconnected from said agitator shaft.

7. In a gearing for washing machines, driving means comprising a constantly driven upright shaft, an oscillating agitator shaft, a disk eccentrically mounted on said constantly driven shaft means, a pitman comprising an eccentric strap adjacent and radially disposed with respect to the constantly driven shaft means and embracing said disk and a reach member projecting therefrom, means for connecting said pitman and oscillating shaft so that rotation of said disk oscillates said shaft, and means for optionally connecting or disconnecting the disk member from operative relation with the constantly driven shaft means, said means comprising cooperating interengaging driving and driven clutch parts, the former of which is fixed for rotation with said disk and means for selectively effecting relative axial movement between said clutch parts for connecting and disconnecting said disk member to said constantly driven shaft means as aforesaid.

8. In a gearing for washing machines having a tub, said gearing being disposed below the tub, an oil-tight housing surrounding said gearing, said gearing including wringer shaft means having a portion located within said housing, worm and gear mechanism for continuously driving said shaft means, a vertical agitator shaft projecting through the bottom of the tub and having its lower end within said housing, a pinion gear for driving said second shaft, a toothed member in said housing meshing with said pinion gear, eccentric means mounted on said first shaft means and connected to said toothed member for driving the same with a back-and-forth movement, and clutch means for selectively connecting and disconnecting said eccentric means to said constantly driven shaft means.

9. In a gearing for washing machines having a tub, said gearing being disposed below the tub, an oil-tight housing surrounding said gearing, said gearing including vertical wringer shaft means having a portion within said housing, worm and gear mechanism for continuously driving said wringer shaft means, an eccentric disk mounted on said wringer shaft means, a vertical agitator shaft projecting through the bottom of the tub and having its lower end within said housing, a pinion mounted on said second shaft, a toothed member in said housing meshing with said pinion, means including an eccentric strap around said disk for connecting said disk in driving relation with respect to said toothed member, and clutch means for selectively connecting or disconnecting said disk to said wringer shaft means.

10. In gearing for washing machines having a tub, said gearing being disposed below the tub, an oil-tight housing surrounding the gearing, said gearing including constantly driven wringer shaft means having a portion located within said housing, a worm wheel on said portion of the wringer shaft means, a driving shaft, a worm on said driving shaft engaging said worm wheel, a vertical oscillating agitator shaft projecting through the bottom of the tub and having a portion within the housing, means connecting said agitator shaft and wringing shaft means to oscillate the agitator shaft, said means including a pinion connected to said agitator shaft, a toothed member constantly meshing with said pinion, an eccentric disk on said wringer shaft means, means including a rod operatively connecting said toothed member to said disk, and clutch means to render said connecting means inoperative to connect said agitator shaft and driven shaft means whereby said wringer shaft means may be driven when disconnected from said agitator shaft.

11. In gearing for washing machines having a tub, said gearing being disposed below the tub, an oil-tight housing surrounding the gearing, said gearing including a straight constantly driven wringer shaft having a portion located within said housing, a worm wheel on said portion of the wringer shaft, a driving shaft, a worm on said driving shaft engaging said worm wheel, a vertical oscillating agitator shaft projecting through the bottom of the tub and having a portion within the housing, means connecting the shafts to oscillate the agitator shaft, said means including a pinion connected to said agitator shaft, a pivoted segmental rack meshing with said pinion, an eccentric disc on said driven shaft, a link connected to said disc and pivoted to said segmental rack, and clutch means to render said connecting means inoperative to connect the shafts whereby said wringer shaft may be driven when disconnected from said agitator shaft.

12. In gearing for washing machines having a tub, said gearing being disposed below the tub, an oil-tight housing surrounding the gearing, said gearing including constantly driven wringer shaft means having a portion located within said housing, a worm wheel on said portion of the wringer shaft means, a driving shaft, a worm on said driving shaft engaging said worm wheel, a vertical oscillating agitator shaft projecting through the bottom of the tub and having a portion within the housing, means connecting said agitator shaft and wringing shaft means to oscillate the agitator shaft, said means including a pinion connected to said agitator shaft, a toothed member meshing with said pinion, an eccentric disk on said wringer shaft means, means including a rod operatively connecting said toothed member to said disk, and clutch means to render said connecting means inoperative to connect said agitator shaft and driven shaft means whereby said wringer shaft means may be driven when disconnected from said agitator shaft.

13. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft and means to connect said agitator to said wringer shaft to oscillate said agitator upon rotation of said wringer shaft, said connecting means including an eccentric disc on said wringer shaft within the casing, a strap engaging said disc and operatively connected to said agitator shaft, and clutch means to render said connecting means inoperative to connect the wringer shaft and agitator whereby said wringer shaft may be driven when disconnected from said agitator.

14. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft comprising a driving shaft extending into said casing, a worm on said driving shaft within the casing, and a worm wheel secured on said wringer shaft in engagement with said worm, and means to connect said agitator to said wringer shaft to oscillate said agitator upon rotation of said wringer shaft, said connecting means including an eccentric disc on said wringer shaft within the casing, a strap engaging said disc and operatively connected to said agitator shaft, and clutch means to render said connecting means inoperative to connect the wringer shaft and agitator whereby said wringer shaft may be driven when disconnected from said agitator.

15. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft comprising a driving shaft extending into said casing, a worm on said driving shaft within the casing, and a worm wheel secured on said wringer shaft in engagement with said worm, and means to connect said agitator to said wringer shaft to oscillate said agitator upon rotation of said wringer shaft, said connecting means including an eccentric disc on said wringer shaft within the casing and above said worm wheel, a strap engaging said disc and operatively connected to said agitator shaft, and clutch means to render said connecting means inoperative to connect the wringer shaft and agitator whereby said wringer shaft may be driven when disconnected from said agitator.

16. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft and means to connect said agitator to said wringer shaft to oscillate said agitator upon rotation of said wringer shaft, said connecting means including an eccentric disc on said wringer shaft within the casing, a strap engaging said disc, gear means connecting said strap to said agitator shaft, and clutch means to render said connecting means inoperative to connect the wringer shaft and agitator whereby said wringer shaft may be driven when disconnected from said agitator.

17. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft and means to connect said agitator to said wringer shaft to oscillate said agitator upon rotation of said wringer shaft, said connecting means including an eccentric disc on said wringer shaft within the casing, a strap engaging said disc, a gear on said agitator shaft within the casing, a gear member connected to said strap and engaging said last gear, and clutch means to render said connecting means inoperative to connect the wringer shaft and agitator whereby said wringer shaft may be driven when disconnected from said agitator.

18. In a gearing for washing machines having a tub, a vertical agitator shaft extending through the bottom of the tub, and an agitator mounted on said shaft within the tub, a straight vertical constantly driven wringer shaft at one side of the tub, an oil-tight gear casing below said tub and enclosing portions of said shafts, bearings for said wringer shaft in the top and bottom walls of said casing, means to drive said wringer shaft comprising a driving shaft extending into said casing, a worm on said driving shaft within the casing, and a worm wheel secured on said wringer shaft in engagement with said worm, and means to connect said agitator to said wringer shaft to oscillate said agitator upon rotation of said wringer shaft, said connecting means including an eccentric disc on said wringer shaft within the casing and above said worm wheel, a strap engaging said disc, a gear on said agitator shaft within the casing, a gear member connected to said strap and engaging said last gear, and clutch means to render said connecting means inoperative to connect the wringer shaft and agitator whereby said wringer shaft may be driven when disconnected from said agitator.

OSCAR E. STOKES.